US006700120B2

(12) United States Patent
Hager

(10) Patent No.: US 6,700,120 B2
(45) Date of Patent: Mar. 2, 2004

(54) METHOD FOR IMPROVING SIGNAL-TO-NOISE RATIOS FOR ATMOSPHERIC PRESSURE IONIZATION MASS SPECTROMETRY

(75) Inventor: James W. Hager, Mississauga (CA)

(73) Assignee: MDS Inc., Concord (CA)

( * ) Notice: Subject to any disclaimer, the term of this patent is extended or adjusted under 35 U.S.C. 154(b) by 47 days.

(21) Appl. No.: 09/726,042

(22) Filed: Nov. 30, 2000

(65) Prior Publication Data

US 2002/0063211 A1 May 30, 2002

(51) Int. Cl.[7] .......................... B01D 59/44; H01J 49/00
(52) U.S. Cl. ........................ 250/292; 250/282; 250/281
(58) Field of Search ................................ 250/292, 287, 250/288, 281

(56) References Cited

U.S. PATENT DOCUMENTS 4,736,101 A * 4/1988 Syka et al. ................. 250/292
4,963,736 A 10/1990 Douglas et al. ............. 250/292
5,206,508 A * 4/1993 Alderdice et al. .......... 250/281
5,521,382 A * 5/1996 Tanaka et al. .............. 250/281
5,572,035 A * 11/1996 Franzen ...................... 250/292
5,652,427 A * 7/1997 Whitehouse et al. ....... 250/288
6,015,972 A 1/2000 Hager
6,093,929 A * 7/2000 Javahery et al. ............ 250/282
6,331,702 B1 * 12/2001 Krutchinsky et al. ....... 250/281
6,528,784 B1 * 3/2003 Tang et al. ................. 250/282
6,627,912 B2 * 9/2003 Bandura et al. ............ 250/582

FOREIGN PATENT DOCUMENTS

EP 1 006 559 6/2000
WO WO 98/06481 2/1998
WO WO 98/56030 12/1998

* cited by examiner

*Primary Examiner*—John R. Lee
*Assistant Examiner*—Kalimah Fernandez
(74) *Attorney, Agent, or Firm*—Bereskin & Parr

(57) ABSTRACT

A method of improving the signal to noise ratio of an ion beam, utilizing a tandem mass spectrometer comprising two mass filters separated by a collision cell. The first mass filter is operated in a resolving mode such that only a narrow mass-to-charge range of precursor ions are stable and accelerated towards the collision cell which contains neutral gas to promote collisional activation and subsequent fragmentation of unwanted fragile ions while minimizing fragmentation of desired analyte ions. The second mass filter is scanned synchronously with the first mass filter such that only ions that do not fragment are recorded by the ion detector. Thus, analyte ions that have fragmentation values higher than unwanted background ions are preferentially detected thereby increasing the signal-to-noise ratio of the ion beam.

27 Claims, 4 Drawing Sheets

METHOD FOR IMPROVING SIGNAL-TO-NOISE RATIOS FOR ATMOSPHERIC PRESSURE IONIZATION MASS SPECTROMETRY

FIELD OF THE INVENTION

This invention relates to a method of operating a tandem mass spectrometer to improve signal-to-noise ratio of an ion beam. The invention has particular, but not exclusive, application to triple quadrupole mass spectrometers using electrospray ionization techniques.

BACKGROUND OF THE INVENTION

Tandem mass spectrometry is widely used for trace analysis and for the determination of ion structure. Commonly, the mass spectrometers used are quadrupole mass spectrometers which each have a set of four elongated conducting rods. In particular, triple quadrupole systems are widely used for tandem mass spectrometry. During operation, the mass resolving quadrupoles at either end of the triple quadrupole arrangement, are pumped to a relatively high vacuum ($10^{-5}$ Torr) while a central quadrupole is usually located in a collision cell and is maintained at a higher pressure for the purpose of promoting fragmentation of selected precursor ions.

Conventional resolving quadrupole mass spectrometers are subjected to both RF and DC voltages that require stringent length and machining requirements on the rod set. For instance, these rods are made of metallized ceramic, have a length of 20 cm or more and roundness tolerances better than 20 micro-inches and straightness tolerances better than 100 micro-inches. However, quadrupoles can also be operated in a condition where they are only subjected to RF voltages. In this case, the length limitation characteristic of RF/DC resolving quadrupoles no longer applies (rods as short as 2.4 cm may be used) and mechanical tolerances for rod roundness and straightness are considerably relaxed (tolerances of +/−2/1000 of an inch are used). Furthermore, there is no need for high precision, high voltage DC power supplies in the RF-only mode of operation.

When both DC and RF voltages are applied between the rod sets of the quadrupole, the quadrupole acts as a mass filter such that only ions of a pre-selected mass-to-charge ratio can pass therethrough for detection by an ion detector. The RF and DC voltages are varied depending on the frequency of operation and the mass range of interest. In the case of applying only an RF voltage to the quadrupole, the quadrupole acts as an ion pipe, transmitting ions over a wide mass-to-charge ratio while also permitting gas therein to be pumped away. Mass resolution can also occur in RF only quadrupoles since ions that are only marginally stable under a particular applied RF voltage gain excess axial kinetic energy due to the exit fringing field of the rod structure.

The structure and operation of a typical tandem mass spectrometer will now be described including commonly accepted designators for individual rod sets. Firstly, ions are produced from a trace substance that needs to be analyzed. These ions are guided and focused via an RF-only (typically 1 MHz) quadrupole rod set (Q0) to a first mass spectrometer including a quadrupole rod set (Q1), acting as a mass filter, for selecting parent or precursor ions of a particular mass-to-charge ratio. These selected precursor ions are then sent to another rod set (Q2) that has collision gas supplied to it thus acting as a collision cell for the fragmentation of the selected precursor ions. Typically, a collision cell is only subjected to RF voltage. The fragment ions are then sent to a second mass analyzing quadrupole rod set (Q3) that acts as a scannable mass filter for the daughter or fragment ions produced in the collision cell. A detector detects the ions selected in the second mass analyzing quadrupole, for recordal to generate a spectrum of the fragment ions. In tandem mass spectrometers, the gases used in the focusing rod set and the collision cell improve the sensitivity and mass resolution by a process known as collisional focusing (U.S. Pat. No. 4,963,736).

Unfortunately, known ion sources do not generate a pure stream of ions. Thus, mass spectra obtained from ions generated by atmospheric pressure ionization techniques such as electrospray ionization frequently contain many unwanted chemical components. These components are often due to cluster ion formation in the atmosphere-to-vacuum interface, the presence of which impedes identification of target analytes. In addition, there is sample dependent background noise from high velocity ions and clusters from the RF-only mass spectrometer. However, the inventor of the present invention has found that many of these unwanted cluster species are more fragile than the target analytes and can thus be discriminated against with the use of ion fragmentation techniques. This will allow for preferential detection of precursor ions.

SUMMARY OF THE INVENTION

In accordance with the present invention, there is provided a method of improving the signal to noise ratio of an ion beam, the method comprising:

(1) subjecting the ion beam to a first mass resolving step, to select precursor ions;

(2) colliding said precursor ions with a gas, to promote at least one of fragmentation and reaction of unwanted ions, whereby the unwanted ions generate secondary ions having a mass-to-charge ratio different from the mass-to-charge ratio of the precursor ions; and (3) subjecting the ion beam including the secondary ions to a second mass resolving step, to reject ions with a mass-to-charge ratio different from the mass-to-charge ratio of the precursor ions, thereby increasing the signal-to-noise ratio of the ion beam.

Preferably the method includes effecting step (1) in a first mass spectrometer, step (2) in a collision cell, and step (3) in a second mass spectrometer. More preferably, the method includes scanning the first mass spectrometer through a range of mass-to-charge ratios and synchronously scanning the second mass spectrometer to select ions with the mass-to-charge ratio of the precursor ions. Alternatively, step (3) can be effected in a collision cell.

Depending on where step (3) is effected, the second mass spectrometer or the collision cell can either be operated to reject ions having a mass-to-charge ratio less than the mass-to-charge ratio of the precursor ions, or can be set to reject ions with mass-to-charge ratios both greater than and less than the mass-to-charge ratio of the precursor ions.

Preferably, the first and second mass spectrometers are quadrupole mass filters and the collision cell includes a quadrupole rod set. Further, the first and second mass spectrometers can be either one of a 3-dimensional ion trap mass spectrometer, a 2-dimensional ion trap mass spectrometer or a time-of-flight mass spectrometer. In addition, the second mass spectrometer can be provided as a quadrupole operated in RF-only mode with a q value between 0.6 and 0.907.

The collision cell can include an RF quadrupole or multipole having RF voltage applied to it which can be adjusted such that the precursor ions of interest emerging from the first mass spectrometer are transmitted to the second mass spectrometer. This collision cell contains neutral gas to promote collisional activation and subsequent fragmentation of the unwanted ions.

An alternative method would be to apply a resolving DC voltage to the second mass spectrometer while maintaining a q value near 0.706. This resolving DC voltage enhances the selectivity of the precursor ions over the unwanted ions.

As noted above, another alternative method would be to operate the collision cell with a and q parameters such that only the precursor ions of interest are stable and thus transmitted to the ion detector. This avoids the need for a second mass spectrometer.

Thus, this method increases the signal-to-noise ratio of an ion beam containing an analyte ion species with fragmentation thresholds greater than unwanted chemical species in the ion beam such as clusters that are more fragile than the analytes of interest. This results in considerable spectral simplification and easier identification of the analyte ions of interest. The ion beam can then be subject to further steps of fragmentation and/or reaction by mass analysis, in known manner.

Further objects and advantages of the invention will appear from the following description, taken together with the accompanying drawings.

DETAILED DESCRIPTION OF THE DRAWINGS

For a better understanding of the present invention and to show more clearly how it may be carried into effect, reference will now be made, by way of example, to the accompanying drawings which show a preferred embodiment of the present invention and in which.

Figure 1:
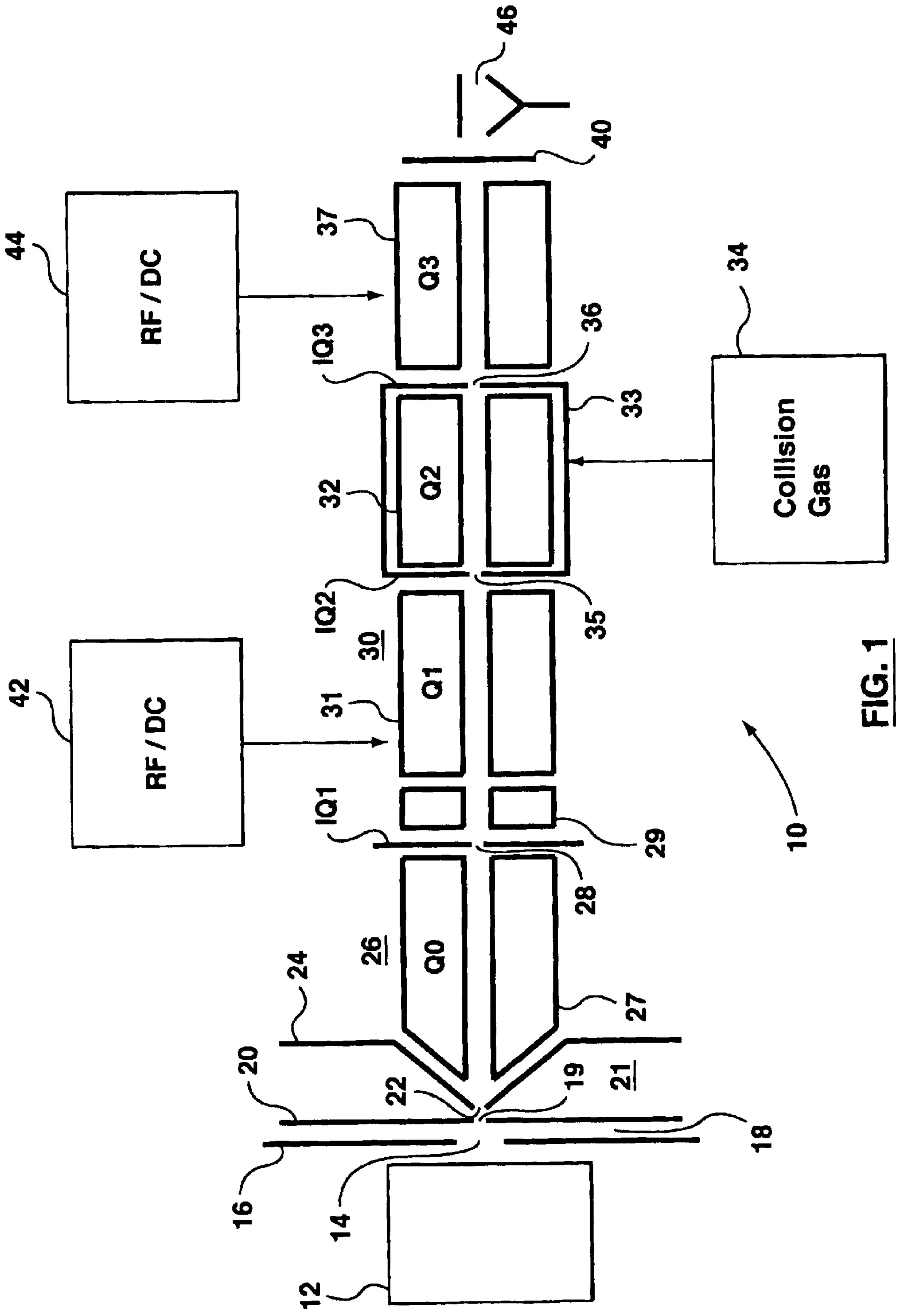
FIG. 1 is a schematic description of a conventional triple quadrupole mass spectrometer.
Figure 3A:
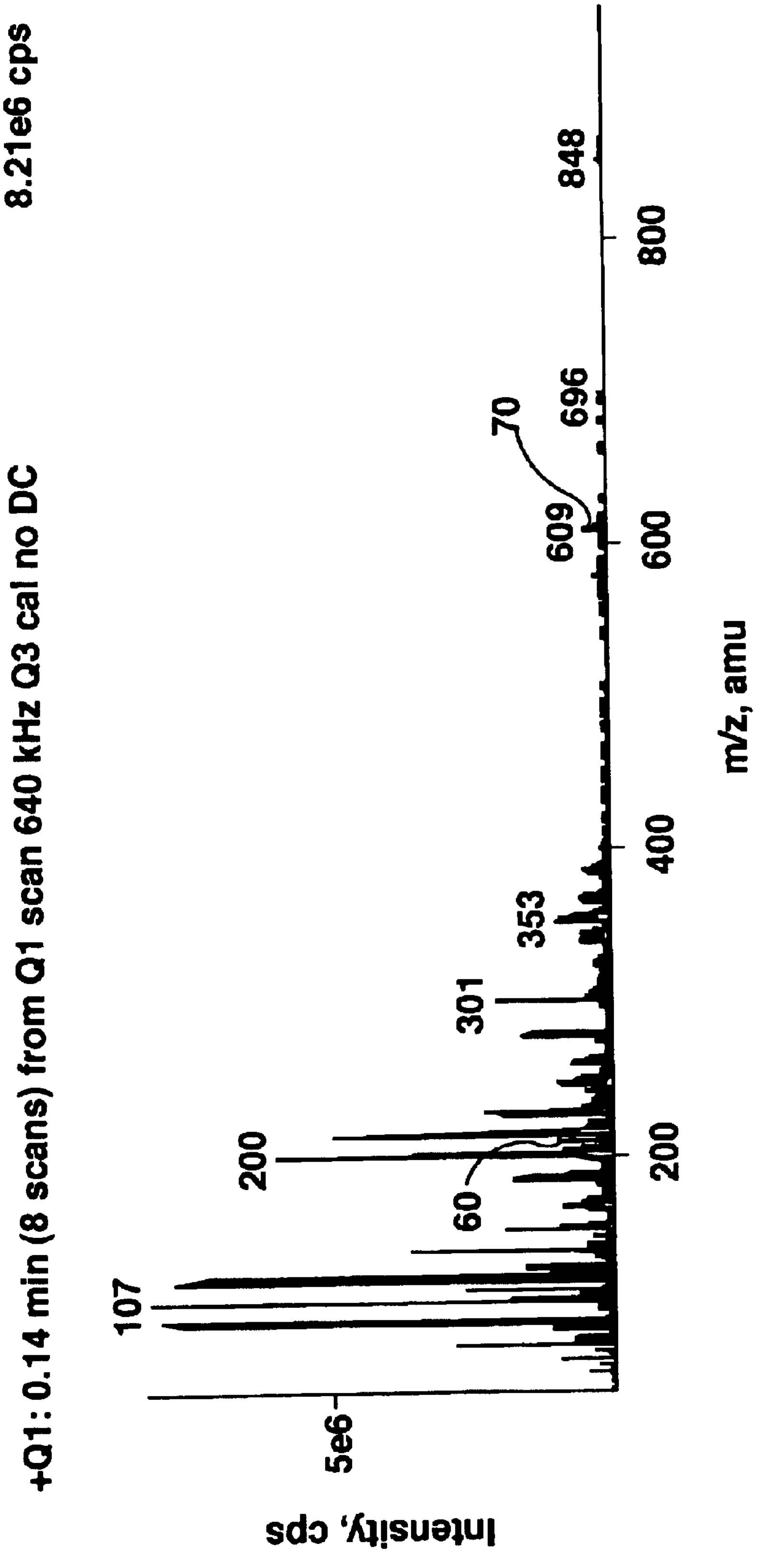
Figure 3B:
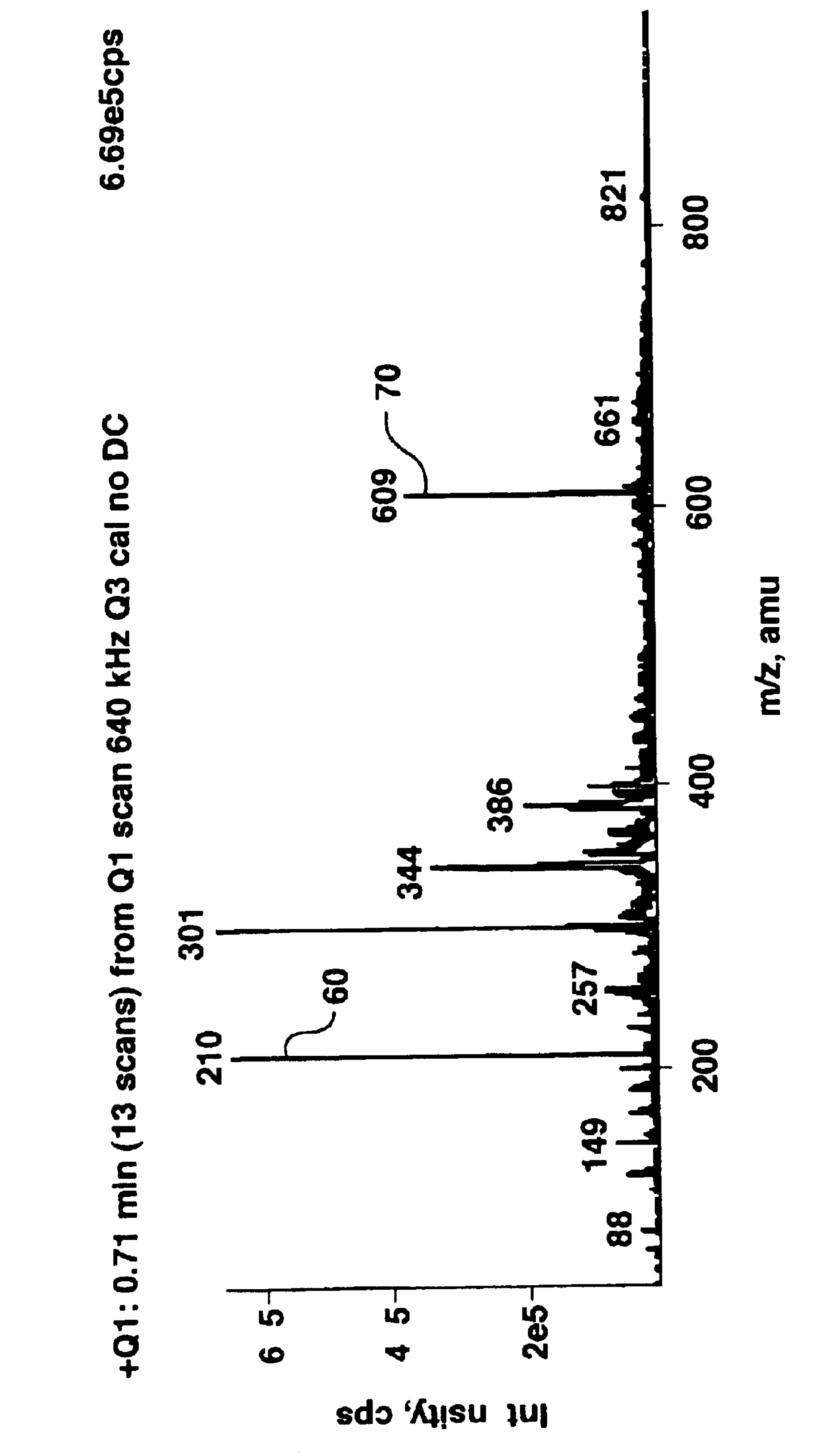

FIG. 3*a* is an electrospray ionization mass spectrum of minoxidil and reserpine obtained by scanning the first and second mass analysis sections of the spectrometer of FIG. 1, without collision gas in the collision cell; and FIG. 3*b* is an electrospray ionization mass spectrum of minoxidil and reserpine obtained by scanning the first and second mass analysis sections with collision gas in the collision cell and operating the second mass spectrometer at q=0.78 for the precursor ions emerging from the first mass spectrometer.

DETAILED DESCRIPTION OF THE PREFERRED EMBODIMENT

Referring first to FIG. 1, a schematic of a conventional triple quadrupole mass spectrometer is displayed and is given the general reference 10. In known manner, the apparatus 10 includes an ion source 12, which may be an electrospray, an ion spray, a corona discharge device or any other known ion source. The ion source 12 could be either pulsed or continuous. Ions from the ion source 12 are directed through an aperture 14 in an aperture plate 16 into conventional curtain gas chamber 18, which is supplied with curtain gas from a source (not shown). The curtain gas can be argon, nitrogen or another inert gas as described in U.S. Pat. No. 4,861,988, Cornell Research Foundation Inc. (which also discloses a suitable ion spray device).

The ions then pass through an orifice 19 in an orifice plate 20 and enter a differentially pumped vacuum chamber 21. The ions pass through an aperture 22 in a skimmer plate 24 and enter a vacuum chamber 26. Typically, the differentially pumped vacuum chamber 21 has a pressure on the order of 2 Torr and the vacuum chamber 26 is evacuated to a pressure of about 7 mTorr. The vacuum chamber 26 is considered to be the first 'vacuum' chamber due to the low pressure contained therein. Conventional pumps and associated equipment are not shown for simplicity.

The first vacuum chamber 26 contains an RF-only multipole ion guide 27, also identified as Q0 (the designation Q0 indicates that it takes no part in the mass analysis of the ions). This can be any suitable multipole, but typically a quadrupole rod set is used. The function of RF-only multiple ion guide 27 is to cool and focus the ions, and it is assisted by the relatively high gas pressure present in the first vacuum chamber 26. Vacuum chamber 26 also serves to provide an interface between ion source 12, which is at atmospheric pressure, and subsequent lower pressure vacuum chambers, thereby serving to remove more of the gas from the ion stream, before further processing.

The ions then pass through an aperture 28 on an interquad plate IQ1, which separates vacuum chamber 26 from a second or main vacuum chamber 30. The main vacuum chamber 30 contains RF-only rods 29, a mass resolving spectrometer 31, an interquad aperture plate IQ2, a collision cell 33, an interquad aperture plate IQ3 and a mass resolving spectrometer 37. Following the mass resolving spectrometer 37 is exit lens 40, having an aperture (not shown) and ion detector 46. Main vacuum chamber 30 is evacuated to approximately $1\times10^{-5}$ Torr.

The RF-only rods 29 are of short axial extent and serve as a Brubaker lens. The mass resolving spectrometer 31 includes a quadrupole rod set Q1. The collision cell 33, including a quadrupole rod set 32 (also identified as Q2), is supplied with collision gas from a collision gas source 34. The collision cell 33 is preceded by the interquad aperture plate IQ2, having an aperture 35, and is proceeded by the aperture plate IQ3, having an aperture 36. The collision cell 33 thus defines an intermediate chamber. The mass resolving spectrometer 37 includes a quadrupole rod set Q3.

Conventionally, the rod sets Q1 and Q3 of the mass resolving spectrometer 31 and mass resolving spectrometer 37 have both RF and DC applied thereto, from power supplies 42 and 44, to act as resolving quadrupoles, transmitting ions within a specified mass-to-charge (m/z) window. The quadrupole rod set Q2 is coupled to the quadrupole rod set Q3 via a capacitive network (not shown) so that the quadrupole rod set Q2 is subject to just an RF signal.

The present inventor has realized that many background species, such as cluster ions, fragment much more readily than do many analyte compounds. The present invention takes advantage of this behaviour. Therefore, to detect analyte ions in the presence of high concentrations of easily fragmented background ions, the mass resolving spectrometer 31, comprising the quadrupole rod set Q1, is scanned through an m/z range of interest. The transmitted ions are then directed into pressurized collision cell 33 at a collision energy sufficient to dissociate the background ions, but insufficient to fragment the analyte ions. This collision energy is dependent on the analyte ions of interest and the background ions. The second mass resolving spectrometer 37, comprising the third quadrupole rod set Q3, is then scanned synchronously with the first mass resolving spectrometer 31, such that the unfragmented precursor ions are transmitted to ion detector 46 while lower m/z fragment ions from the background precursor ions are discriminated against.

The stability conditions (i.e. the stability of the ions) in a quadrupole mass spectrometer are dictated by the Mathieu a and q parameters where:

$$a=8\ eU/(m\Omega^2 r_0^2) \quad (1)$$

$$q=4\ eV/(m\Omega^2 r_0^2) \quad (2)$$

where:

U is the amplitude of the DC voltage applied to the rods;

V is the amplitude of the RF voltage applied to the rods;

e is the charge on the ion;

m is the mass of the ion;

Ω is the RF frequency; and $r_0$ is the inscribed radius of the rod set.

A plot of values for the Mathieu a and q parameters illustrates the ion stability region which is possible for various RF and DC voltages and various ion m/z ratios. RF and DC voltages can then be chosen to create a scan line that determines which ion masses will be stable in the mass spectrometer. For instance, in known manner, RF and DC voltages can be chosen to select a scan line which passes through the tip 50 of the stability diagram shown in FIG. 2 with q being approximately equal to 0.706. Alternatively, RF-only operation of the quadrupole corresponds to a scan line with a equal to 0 (i.e. no applied resolving DC). As FIG. 2 shows, the first stability region requires that an ion has Mathieu a and q parameters that are chosen to be less than 0.237 and 0.908 respectively and that are below the curve indicating the boundary of the stability region shown.

Figure 2:
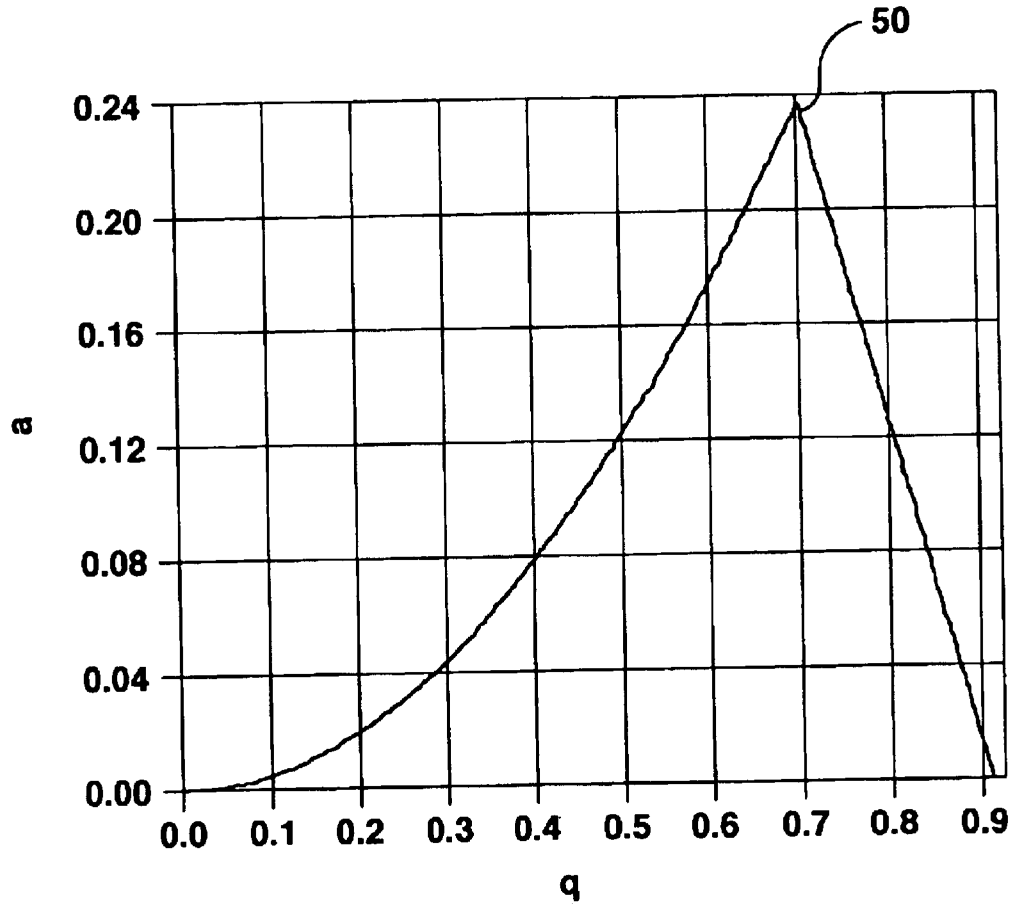
FIG. 2 is a conventional quadrupole stability diagram.

In the first embodiment of the method of the present invention, the first mass resolving spectrometer 31 is operated at the tip 50 of the stability diagram shown in FIG. 2 while the collision cell 33 and the second mass resolving spectrometer 37 are operated in RF-only mode. The q value of the second mass resolving spectrometer 37 is chosen to be between 0.6 to 0.907 for the precursor ions emerging from the first mass resolving spectrometer 31. This value of q was chosen to ensure that the unfragmented precursor ions will be transmitted through the second mass resolving spectrometer 37 to the detector 46 while lower m/z fragment ions with q values greater than 0.907 will be rejected by the second mass resolving spectrometer 37 and thus will not be detected. The second mass resolving spectrometer 37 is operated in RF-only mode in order to maintain high sensitivity, i.e. to ensure high efficiency in transmitting the precursor ions.

FIG. 3*a* shows a typical mass spectrum of a mixture of 50 pg/μL each of minoxidil and reserpine using electrospray ionization. No collision gas was added to the collision cell 33 and the second mass resolving spectrometer 37 was scanned synchronously while utilizing a q value of 0.78. As such, both the collision cell 33 and the second mass resolving spectrometer 37 acted as ion guides with no resolving effect; all mass analysis/resolution was provided by the first mass resolving spectrometer 31. The known minoxidil and reserpine analytes, which are located at m/z values of 210 atomic mass units (amu) (60 on FIG. 3*a*) and 609 atomic mass units (70 on FIG. 3*a*), are difficult to identify due to the large number of background species in the mass spectrum.

FIG. 3*b* shows the improvement in spectral analysis achieved from the addition of a collision gas to collision cell 33 and using a 20 $eV_{laboratory}$ collision energy (in known manner, the reference to "laboratory" simply indicates the frame of reference). In known manner, varying DC potentials are provided along the length of the spectrometers to displace ions through the spectrometers. The collision energy was provided by an appropriate potential drop between the DC rod offset values of mass resolving spectrometer 31 and the collision cell 33. This promotes fragmentation of unwanted background ions, while largely not fragmenting the desired analyte ions. The fragments, with lower m/z ratios, are then rejected in the second mass resolving spectrometer 37. The minoxidil and reserpine analyte ions are now easily identified because most of the background ion spectral peaks have been eliminated. Closer inspection of the two spectra in FIG. 3 shows that the intensities of many of the background ions have been reduced by more than a factor of 500, Meanwhile, the minoxidil intensity has only been diminished by about 30% and there has been no loss in the reserpine ion intensity. Thus it is clear that the signal-to-noise of the ion beam whose spectrum is shown in FIG. 3*b* is superior to that of FIG. 3*a*, however, it is to be borne in mind that the signal-to-noise improvements of the described method rely on the background ions being more fragile than the analyte ions. Consequently, the method of the present invention will not discriminate against background ions that are more stable than the analyte ions.

A second embodiment of the method of the present invention involves the addition of a resolving DC voltage to the second mass resolving spectrometer 37 while maintaining a q value near 0.706, i.e. the q value at peak 50 in FIG. 2. The second mass resolving spectrometer 37 will then reject both lighter and heavier ions outside a pass band established around q=0.706. This will enhance the selectivity of precursor ions over fragment ions at the expense of sensitivity since a narrower m/z window is stable in the second mass resolving spectrometer 37.

A third embodiment of the method of the present invention involves selecting the a and q parameters of collision cell 33 such that only precursor ions emerging from the first mass resolving spectrometer 31 are stable throughout the length of the collision cell 33. In this case there is no explicit need for the presence of the second mass resolving spectrometer 37 since mass discrimination is carried out by the collision cell 33. However, it must be understood that, due to the presence of gas in collision cell 33, precise mass selection is not possible; i.e. the boundaries between ions with m/z ratios that are transmitted and those that are rejected, are blurred and imprecise. Thus, RF and DC voltages are such as to establish a wide pass band that promotes passage of the precursor ions of interest, while rejecting ions with an m/z ratio significantly different from the precursor ions. In this case, the second mass resolving spectrometer 37 could be utilized to enhance the discrimination, by being set to a narrow pass band.

In the present invention, there are no critical values for collision energy, collision gas pressure or the nature of the collision gas. Rather, the optimum values of these parameters are analyte dependent. Furthermore, although the method of the present invention is particularly effective for electrospray ionization, it may also be useful for ions generated via atmospheric pressure chemical ionization, atmospheric pressure photoionization and matrix assisted laser desorption ionization. All of these techniques are forms of atmospheric pressure ionization except for the last technique which can be carried out within a vacuum chamber.

The present invention as described is solely for the purpose of cleaning up an initial ion current or signal, so as to provide a stream of precursor ions with an improved signal-to-noise ratio, i.e. with fewer unwanted ions. In particular, the invention addresses the problem of unwanted ions from atmospheric pressure ionization sources, e.g.

electrospray sources. It will be understood by those skilled in this art that, having established a stream of precursor ions with a good signal-to-noise ratio, these precursor ions can be handled, processed and analyzed in accordance with any known technique. Thus, the precursor ions can be passed into a further fragmentation or collision cell configured and operated to promote fragmentation/reaction of the precursor ions. The resulting product ions can then be subject to separate mass analysis, or indeed subject to further fragmentation/reactions steps for MS/MS, MS/MS/MS or $MS^n$ analysis and the like. For instance, for MS/MS analysis, precursor ions are selected in a first mass selection stage, the precursor ions are then passed into a collision cell to promote fragmentation and/or reaction of the precursor ions (note that here it is fragmentation of the precursor ions that is being promoted, rather than fragmentation of unwanted ions as in the present invention), and a second, downstream mass analyzer is then used to analyze the product ions.

The method of the present invention described herein can also be employed with any combination of mass analyzers separated by a fragmentation region. Other mass spectrometers include, but are not limited to, time-of-flight mass spectrometers, three-dimensional ion trap mass spectrometers, two-dimensional ion trap mass spectrometers, and Wein filter mass spectrometers.

It should be understood that various modifications can be made to the preferred embodiments described and illustrated herein, without departing from the present invention, the scope of which is defined in the appended claims.

What is claimed is:

1. A method of improving the ratio of precursor ions to unwanted ions in an ion beam, the method comprising:

(1) subjecting the ion beam comprising both unwanted ions and precursor ions to a first mass resolving step, to select the precursor ions;

(2) colliding the ion beam comprising the unwanted ions and the precursor ions with a gas signal brackets at a collision energy insufficient to cause substantial fragmentation of the precursor ions but sufficient to promote at least one of fragmentation and reaction of the unwanted ions, wherein the precursor ions remain substantially unfragmented after said colliding step, and whereby at least some of the unwanted ions generate secondary ions having a mass-to-charge ratio different from the mass-to-charge ratio of the precursor ions; and (3) subjecting the ion beam including the secondary ions and the substantially unfragmented precursor ions to a second mass resolving step, to reject at least some of the secondary ions with a mass-to-charge ratio different from the mass-to-charge ratio of the precursor ions, wherein the substantially unfragmented precursor ions remain in the ion beam for subsequent analysis, thereby increasing the ratio of precursor ions to unwanted ions in the ion beam.

2. A method as claimed in claim 1, which includes effecting step (1) in a first mass spectrometer, step (2) in a collision cell, and step (3) in a second mass spectrometer.

3. A method as claimed in claim 2, which includes scanning the first mass spectrometer through a range of mass-to-charge ratios and synchronously scanning the second mass spectrometer to select ions with the mass-to-charge ratio of the precursor ions.

4. A method as claimed in claim 3, which includes operating the second mass spectrometer to reject ions having a mass-to-charge ratio less than the mass-to-charge ratio of the precursor ions.

5. A method as claimed in claim 3, which includes operating the second mass spectrometer to reject both ions with a mass-to-charge ratio greater than the mass-to-charge ratio of the precursors ions and ions with a mass-to-charge ratio less than the mass-to-charge ratio of the precursor ions.

6. A method as claimed in claim 1, which includes effecting step (1) in a first mass spectrometer and effecting steps (2) and (3) in a collision cell.

7. A method as claimed in claim 6, which includes scanning the first mass spectrometer through a range of mass-to-charge ratios and synchronously scanning the collision cell through a range of mass-to-charge ratios including the mass-to-charge ratio of the precursor ions.

8. A method as claimed in claim 7, which includes operating the collision cell to reject ions having a mass-to-charge ratio less than the mass-to-charge ratio of the precursor ions.

9. A method as claimed in claim 7, which includes providing a pass band for the collision cell around the mass-to-charge ratio of the precursor ions, thereby to reject both ions with a mass-to-charge ratio greater than the mass-to-charge ratio of the precursor ions and ions with a mass-to-charge ratio less than the mass-to-charge ratio of the precursor ions.

10. A method as claimed in claim 5, which includes providing each of the first and second mass spectrometers as a quadrupole mass filter and providing the second mass spectrometer with a detector.

11. A method as claimed in claim 10, which includes providing the collision cell with a quadrupole rod set.

12. A method as claimed in claim 9, which includes providing the first mass spectrometer as a quadrupole mass filter.

13. A method as claimed in claim 12, which includes providing the collision cell with a quadrupole rod set and a detector.

14. A method as claimed in claim 3, which includes providing the first mass spectrometer as a 3-dimensional ion trap mass spectrometer.

15. A method as claimed in claim 3, which includes providing the first mass spectrometer as a 2-dimensional ion trap mass spectrometer.

16. A method as claimed in claim 3, which includes providing the first mass spectrometer as a time-of-flight mass spectrometer.

17. A method as claimed in claim 3, which includes providing the first mass spectrometer as a time-of-flight mass spectrometer.

18. A method as claimed in claim 10, 11, 12 or 13, which includes operating the second mass spectrometer in an RF-only mode with a q value between 0.6 and 0.907 for selecting said precursor ions.

19. A method as claimed in claim 11 or 13, which includes operating the quadrupole rod set of the collision cell with a q value in the range of 0.6 to 0.907 for the mass-to-charge ratio of the precursor ions.

20. A method as claimed in claim 19, which includes providing a DC signal to the second mass spectrometer and operating the second mass spectrometer with a q value near 0.76 to provide a passband around the tip of the first stability region.

21. A method as claimed in claim 3, 14, 15 or 16, which includes providing the second mass spectrometer as a time-of-flight mass spectrometer.

22. A method as claimed in claim 3, 14, 15 or 16, which includes providing the second mass spectrometer as a 3-dimensional ion trap mass spectrometer.

23. A method as claimed in claim 3, 14, 15 or 16, which includes providing the second mass spectrometer as a 2-dimensional ion trap mass spectrometer.

24. A method as claimed in claim 3, which includes providing said collision cell with an RF multipole rod set, supplying an RF voltage to the multipole rod set, and adjusting the RF voltage such that only said precursor ions of interest from the first mass spectrometer are transmitted through the collision cell.

25. A method as claimed in claim 3, which includes supplying said collision cell with a neutral gas to maintain a desired pressure therein, to promote at least one of fragmentation and reaction of unwanted ions.

26. A method as claimed in claim 1, 3 or 7, which includes subsequently subjecting the ion beam to at least one further stage of colliding the precursor ions with a gas to effect one of reaction and fragmentation to produce product ions and mass analyzing the product ions thereby to effect multiple steps of mass spectrometry.

27. A method as claimed in claim 1, wherein the unwanted ions include ions having a mass-to-charge ratio substantially equal to the mass-to-charge ratio of the precursor ions.

* * * * *

UNITED STATES PATENT AND TRADEMARK OFFICE

CERTIFICATE OF CORRECTION

PATENT NO. : 6,700,120 B2 
DATED : March 2, 2004
INVENTOR(S) : James W. Hager

It is certified that error appears in the above-identified patent and that said Letters Patent is hereby corrected as shown below:

<u>Column 8,</u>
Line 50, delete the following duplicate claim:

"17. A method as claimed in claim 3, which includes providing the first mass spectrometer as a time-of-flight mass spectrometer."
Line 54, replace "18" with -- 17 --.
Line 57, insert the following paragraph :

-- 18. A method as claimed in claim 17 which includes operating the second mass spectrometer with a q value near 0.706 and with a DC value such that the second mass spectrometer operates near the tip of the first stability region. --

Signed and Sealed this

Thirty-first Day of August, 2004

JON W. DUDAS
*Director of the United States Patent and Trademark Office*

UNITED STATES PATENT AND TRADEMARK OFFICE

CERTIFICATE OF CORRECTION

PATENT NO. : 6,700,120 B2
DATED : March 2, 2004
INVENTOR(S) : James W. Hager

It is certified that error appears in the above-identified patent and that said Letters Patent is hereby corrected as shown below:

<u>Column 7,</u>
Line 37, delete "signal brackets".

Signed and Sealed this

Eleventh Day of January, 2005

JON W. DUDAS
*Director of the United States Patent and Trademark Office*